(12) United States Patent
Hamilton

(10) Patent No.: US 8,161,304 B2
(45) Date of Patent: Apr. 17, 2012

(54) POWER MANAGEMENT FOR LARGE MEMORY SUBSYSTEMS

(75) Inventor: James R. Hamilton, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 561 days.

(21) Appl. No.: 12/356,124

(22) Filed: Jan. 20, 2009

(65) Prior Publication Data
US 2010/0185883 A1    Jul. 22, 2010

(51) Int. Cl.
*G06F 1/32* (2006.01)
*G06F 13/00* (2006.01)
*G06F 9/44* (2006.01)

(52) U.S. Cl. ........ 713/320; 711/113; 711/165; 717/120; 717/127; 717/151

(58) Field of Classification Search .......... 713/320; 711/113, 165; 717/120, 127, 151
See application file for complete search history.

(56) References Cited

U.S. PATENT DOCUMENTS

| | | | |
|---|---|---|---|
| 5,781,784 A | 7/1998 | McKinley | |
| 6,151,262 A | 11/2000 | Haroun et al. | |
| 6,292,400 B1 | 9/2001 | Dozza et al. | |
| 6,496,915 B1 | 12/2002 | Halleck | |
| 6,853,603 B1 | 2/2005 | White et al. | |
| 7,051,306 B2 * | 5/2006 | Hoberman et al. | 716/127 |
| 7,218,566 B1 | 5/2007 | Totolos et al. | |
| 7,286,435 B2 | 10/2007 | Odate et al. | |
| 7,890,780 B2 * | 2/2011 | Golasky et al. | 713/300 |
| 2005/0086548 A1 | 4/2005 | Haid et al. | |
| 2006/0149982 A1 | 7/2006 | Vogt | |
| 2007/0171746 A1 | 7/2007 | Tsao et al. | |
| 2007/0223282 A1 | 9/2007 | Sarig | |
| 2008/0058999 A1 * | 3/2008 | Khodorkovsky et al. | 700/297 |
| 2008/0234873 A1 * | 9/2008 | Gorbatov et al. | 700/291 |
| 2009/0125676 A1 * | 5/2009 | Cherian et al. | 711/113 |
| 2009/0132840 A1 * | 5/2009 | Talwar et al. | 713/320 |
| 2009/0327607 A1 * | 12/2009 | Tetrick et al. | 711/118 |

OTHER PUBLICATIONS

Hung, Power-Aware Compilation with Architectural Support and Instruction Scheduling, 2007.*
Ulrich Kremer, Low Power/Energy Compiler Optimizations, 2006, Department of Computer Science Rutgers University.*
Azevedo et al, Architectural and Compiler Strategies for Dynamic Power Management in the Copper Project, 2008, University of California, Irvine.*
Arne Martin Holberg, et al. Innovative Techniques for Extremely Low Power Consumption with 8-bit Microcontrollers. 7903A—AVR—Feb. 2006 http://www.atmel.com/dyn/resources/prod_documents/doc7903.pdf. Last accessed Oct. 15, 2007, 16 pages.
Kevin Morris. Flash Freeze Actel's Igloo Attacks Power, Aug. 29, 2006. http://www.fpgajournal.com/articles_2006/20060829_igloo.htm. Last accessed Oct. 25, 2007, 2 pages.

* cited by examiner

*Primary Examiner* — Paul R Myers
*Assistant Examiner* — Christopher A Daley
(74) *Attorney, Agent, or Firm* — Lee & Hayes, PLLC

(57) ABSTRACT

A power management system is provided. The system includes a permanent storage medium that has a plurality of storage segments that are individually controllable. A power manager analyzes requirements of programs that access the permanent storage medium and selectively enables or disables a subset of the storage segments in order to mitigate power consumption of the storage medium.

20 Claims, 10 Drawing Sheets

POWER MANAGEMENT FOR LARGE MEMORY SUBSYSTEMS

TECHNICAL FIELD

The subject specification relates generally to computer systems and in particular to managing power consumption in large storage subsystems.

BACKGROUND

Memory technology has become so ubiquitous and low-cost that it is often offered free to users. For instance, well-known web sites provide free e-mail accounts to their users where large blocks of memory support the underlying accounts. To support such e-mail services and others, large server farms provide the necessary memory infrastructure (e.g., processors and servers) to manage the respective accounts. Moreover, memory storage itself has become more sophisticated. Generally, large memory subsystems are managed as a hierarchy where essential data being presently processed in a program is pulled into high-speed memory for further processing while lesser-used data remains on the permanent storage medium. The permanent storage medium is generally processed as a homogenous block of memory and which can create other problems by modeling the memory in such a manner. Before considering such problems, a discussion of the memory hierarchy is considered.

The main aspect of the memory hierarchy is to allow reasonably fast access to large amounts of memory. If only a little memory was necessary, fast, static RAM could be employed for all applications. If speed was not also necessary, low-cost dynamic RAM could be utilized to reduce costs. Thus, the memory hierarchy model takes advantage of the principle of locality of data reference to move often-referenced data into fast memory and leave less-used data in slower memory. Unfortunately, the selection of often-used versus lesser-used data varies over the execution of any given program. Therefore, designers cannot simply place data at various levels in the memory hierarchy and leave the data alone throughout the execution of the program. Instead, the memory subsystems need to be able to move data between themselves dynamically to adjust for changes in locality of reference during the program's execution.

The program is largely unaware of the memory hierarchy. In fact, the program only explicitly controls access to main memory and those components of the memory hierarchy at the file storage level and below (since manipulating files is a program-specific operation). In particular, cache access and virtual memory operation are generally transparent to the program. That is, access to these levels of the memory hierarchy usually takes place without any intervention by the program. Thus, the program merely accesses main memory and the hardware (and operating system) take care of the rest.

If the program really accessed main memory on each access, the program would run quite slowly since modern DRAM main memory subsystems are much slower than the CPU. The job of the cache memory subsystems (and the cache controller) is to move data between main memory and the cache so that the CPU can quickly access data in the cache. Likewise, if data is not available in main memory, but is available in slower virtual memory, the virtual memory subsystem is responsible for moving the data from hard disk to main memory (and then the caching subsystem may move the data from main memory to cache for even faster access by the CPU).

As noted above, the permanent memory storage subsystem is often viewed as a homogenous block of memory by the memory hierarchy model. While such a model may be easier to implement, it trades-off the ability to control power consumption in the system. Unfortunately, as memory subsystems have increased in size and density, the aggregate power consumption of the permanent memory storage subsystem has increased. Thus, by processing data as a contiguous or homogenous block of memory, power is inefficiently managed and consequently, overall system costs are increased.

SUMMARY

The following discloses a simplified summary of the specification in order to provide a basic understanding of some aspects of the specification. This summary is not an extensive overview of the specification. It is intended to neither identify key or critical elements of the specification nor delineate the scope of the specification. Its sole purpose is to disclose some concepts of the specification in a simplified form as a prelude to the more detailed description that is disclosed later.

Systems and methods are provided for managing power consumption in large storage subsystems. Storage components having memory and processing capability are segmented into numerous blocks of memory that are individually controllable by a power manager than can include one or more processing units. The power manager continually analyzes program and system storage or memory requirements and selectively enables or disables storage segment subsets in order to conserve power in the system. Power management techniques have been applied to mobile or client devices in the past, where various components of the devices (e.g., processors, I/O, or peripheral devices) are switched into a lower power states when not in use. Such techniques have not been applied to storage systems on such devices since the memory consumes a small part of the overall power budget in a device such as a cell phone. In large server applications however, as large amounts of storage are aggregated in a single location, power consumption in the main storage medium can be considerable. Thus, the power manager dynamically switches off segments as program or system storage or memory requirements change. In general, the storage subsystems have memory and processors that comprise the overall storage subsystem. The processor in the subsystem can thus function as a power manager in order to activate segments on demand. Thus, the amount of storage that is used can be dynamically reduced by asymmetrically taking memory off-line. Rather than processing the storage as one homogeneous system, storage module segments (e.g., a DIMM) are separately controllable. When smaller buffers are needed by program or system requirements, non-used storage components or memory modules are dynamically switched into low power or c-states (possibly even off which is a c-state as well).

The following description and the annexed drawings set forth certain illustrative aspects of the specification. These aspects are indicative, however, of but a few of the various ways in which the principles of the specification can be employed. Other advantages and novel features of the specification will become apparent from the following detailed description of the specification when considered in conjunction with the drawings.

DETAILED DESCRIPTION

Systems and methods are provided to reduce power requirements in large storage subsystems. In one aspect, a power management system is provided. The system includes a permanent storage medium that has a plurality of storage segments that are individually controllable. A power manager analyzes requirements of programs that access the permanent storage medium and selectively enables or disables a subset of the storage segments in order to mitigate power consumption of the storage medium.

As used in this application, the terms "component," "module," "system," "segment," "manager," and the like are generally intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a controller and the controller can be a component. One or more components can reside within a process and/or thread of execution and a component can be localized on one computer and/or distributed between two or more computers. As another example, an interface can include I/O components as well as associated processor, application, and/or API components.

Figure 1:
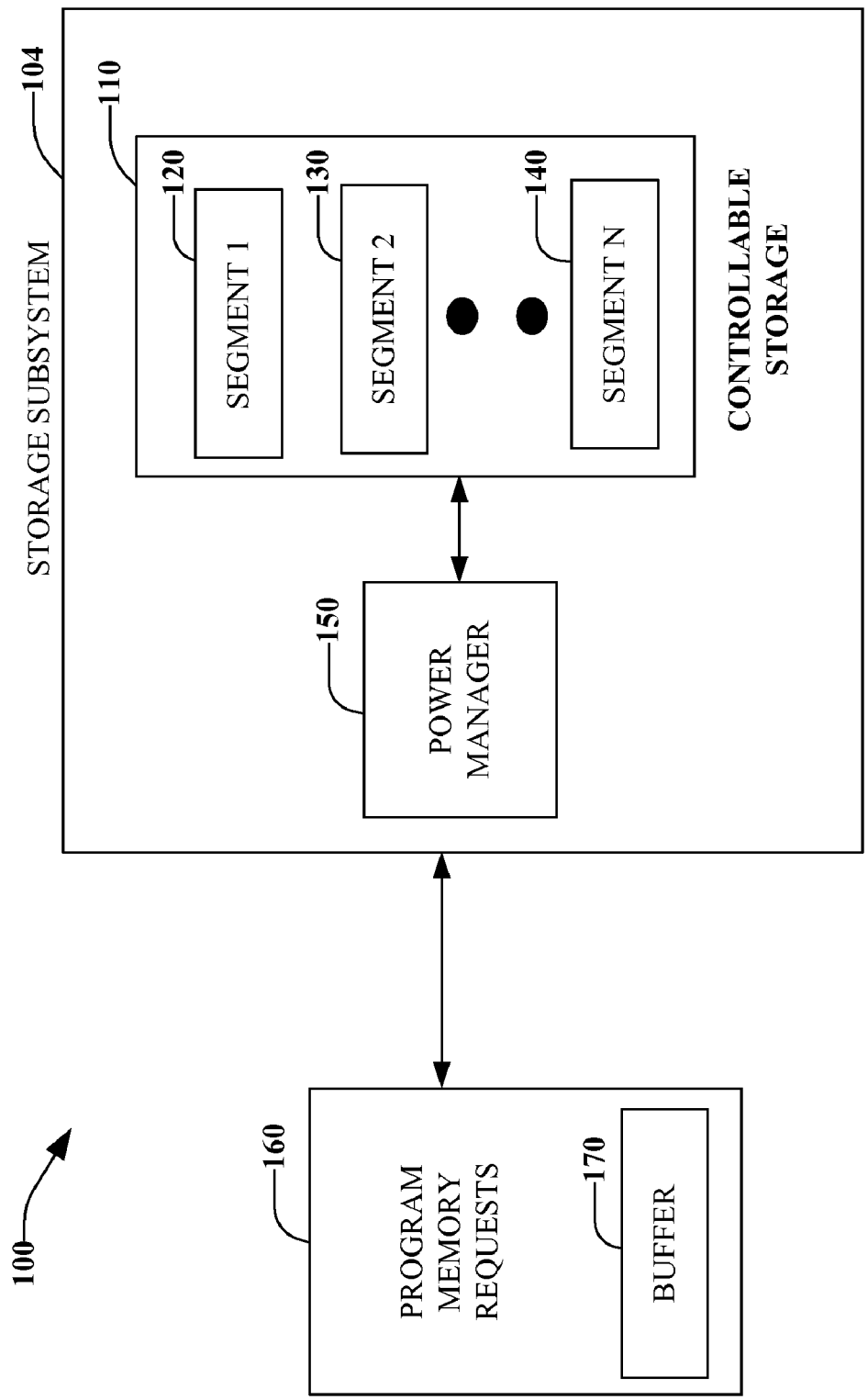
FIG. 1 is a schematic block diagram that illustrates power management in a storage subsystem.

Now referring to FIG. 1, an example system 100 is illustrated for managing power in a storage subsystem 104. Controllable storage 110 is separated into numerous storage blocks or segments of memory 120-140 that are individually controllable by a power manager 150. The power manager 150 analyzes program and system memory requirements via program memory requests 160 and selectively enables or disables storage segment subsets in order to conserve power in the system 100. Generally, the program memory requests 160 are generated from the main computer or server program processor (not shown) whereas the power manager 150 provides dedicated processing to control the segments 120-140. Such processing is described in more detail below with respect to FIG. 2. It is to be appreciated however that power manager functionality can also be included and/or provided by the main computer or server program processor, for example.

In general, large storage subsystems 104 are considered. Storage subsystems can be provided as Storage Area Networks (SANs), Network Attached Storage (NAS) devices, and Direct Attached Storage Devices (DAS) devices, for example. Generally, SANs and NAS devices have very large memories and many CPUs as part of the storage system or subsystem. These components are employed to improve performance of the storage subsystem's primary role as persistent storage. The DAS devices usually have smaller buffers and lower performance CPU's but similar principles apply. However, DAS device capabilities, although behind NAS and SAN performance continues to grow thus the power savings gain can be more important over time.

In general, the system 100 provides storage device power management which can include enabling/disabling segments within devices and/or managing a large farm of individual devices. It is noted that high scale storage subsystems 104 have very large memories and a CPU (or power manager) and frequently many CPUs. Generally, memory buffer size is selected and controlled to deliver the desired system performance but no more. Thus, unused memory or storage banks are disabled (fully or partially) to conserve power. On the CPU or power manager side, there are times when full CPU capabilities are needed so the manufacturers have to provision such services. However, it is rare to need all such capability. Therefore, shut off unused CPUs and for those CPUs that are needed, operate at minimum capacity for a given application and generally no more. Consequently, employ voltage and frequency scaling (used in laptop and desktop systems) to conserve power.

In large server applications, as large amounts of data are aggregated in a single location, power consumption in the main storage medium can be considerable. Thus, the power manager 150 dynamically switches off the segments 120-140 as program or system memory or storage requirements change. As will be described in more detail below, power conservation techniques can also be applied to processors and other components of the system as well. In general, the storage subsystems 104 have memory and processors in accordance with the power manager 150 that comprise the overall storage subsystem. The processor in the subsystem 104 can thus function as the power manager 150 in order to activate or deactivate segments 120-140 on demand. Thus, the amount of storage that is used can be dynamically reduced by asymmetrically taking storage segments 120-140 off-line. Rather than processing the storage or memory as one homogeneous system, storage module segments 120-140 (e.g., a dual inline memory module (DIMM), SAN, DAS) are separately controllable. When smaller buffers are needed by program or system requirements, non-used storage modules 120-140 are dynamically switched into low power or c-states (including off which is a c-state as well).

In general, the segments 120-140 represent smaller portions of main memory in which to execute in a high speed buffer 170. Thus, the segments 120-140 can be designed such that minimal functionality is maintained in the buffer 170 while other program functionality remains in unused segments. Segments 120-140 that are unused or less frequently accessed can be maintained in a lower power state by the power manager 150 or switched off entirely. If the main program requests other functionality not currently represented in the buffer 170, additional segments 120-140 can be activated. Another feature of storage segmentation is to segment programs in functional blocks. Thus, segmented code modules that may only execute during power down operations for example can remain in a low power state for most of their respective lifetime. Some modules such as help files are rarely used in a normal program. Thus, large amounts of data in static files that are rarely active can be stored in a segment 120-140 that is mostly turned off.

As will be described in more detail below, various methods are available to apportion code in the various segments 120-140. These can be based off of functional requirements, storage requirements, or programmer and designer requirements, for example. In more elaborate segmentation schemes, compilers can receive segment instructions in the form of cues to determine how to segment a program into smaller, manageable blocks designed to conserve power. In some cases, the compilers can be equipped to analyze and simulate code execution to determine code segmentation automatically. In still yet other schemes, intelligent monitor components can analyze code as it is executed on a system. After analyzing the execution for a time, the monitor component provides automated feedback to a compiler regarding which functional aspects of a program are active. The compiler can then employ such feedback to generate segments 120-140 which can then be selectively activated or deactivated by the power manager 150.

Storage segmentation can take many forms and be broken down into smaller components by various rules and policies. For instance, one segment may be the main operating component while other segments are mostly inactive and reside in lower power states by the power manager. These segments can be activated sequentially or in parallel by the active segment in the buffer memory. Sometimes, the segment 120-140 is only active by some trigger from the main system (e.g., power down or power up signal, I/O signal, and so forth). Thus, since little used segments are rarely executed in the buffer 170, they can remain in a lower power state by the power manager 150. Also, metadata may be created that specify to the power manager 150 which segments are needed in the buffer 170 and which segments can be placed into power conservation mode. Moreover, some memory segmentation policies may actually provide for the generation of redundant code. For example, an I/O routine may be replicated in more than one segment to prevent code executing in the buffer 170 from having to access an additional segment 120-140 when calling the routine that potentially exists outside of the main execution routine. As can be appreciated, various other techniques can be applied to determine how program storage is organized into one or more segments 120-140.

Figure 2:
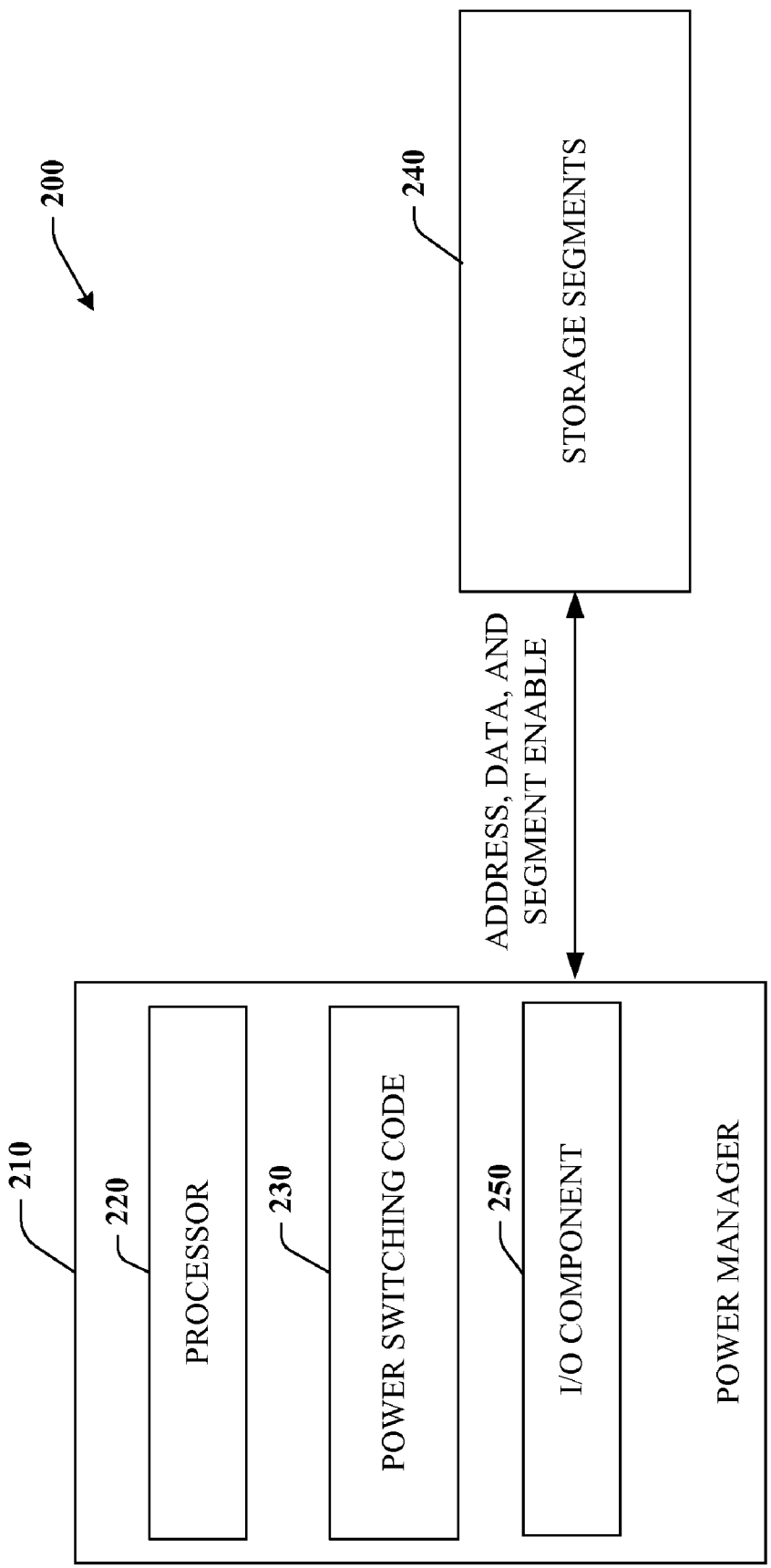
FIG. 2 is a schematic block diagram of a power manager to a control a storage or processor subsystem.

Referring now to FIG. 2, a system 200 illustrates a power manager 210 for mitigating power consumption in a computing system. The power manager 210 includes a processor 220 that executes power switching code 230 that is responsible for reducing power in one or more storage segments 240 or other system aspects described below. Power is controlled via an input/output (I/O) component 250 that can selectively enable or disable memory segments 240 or other components associated with the system 200. The I/O component 250 also controls the flow of address and data signals to the memory segments 240. It is noted that the I/O component 250 can also be operated in a separate sever that can selectively enable or disable other servers or storage components. In general, the power switching code 230 provides multiple power control functionalities. Basically, system functions are monitored and components that are not currently in use are switched off or placed in a lower power state by the processor 220 and the I/O component 250. As noted previously and described in more detail below, programs can be segmented such that code that is likely to be executed is placed in the memory segment 240 that is active while lesser-used functionality is in a segment that can be placed in a lower power state. In addition to controlling the segments 240 to reduce system power, other aspects of power mitigation are also provided via the power switching code 230.

In one aspect, the system 200 can be applied to storage power management in general. For instance, modern storage subsystems can have more than ½ of the power consumed in non-storage devices. For example, flash solid state drive (SSD) power consumption is often more than half the consumption of the processor 220, storage 240, and control circuitry 250. Large storage area networks (SAN) have huge memories 240 and processors 220 that consume a significant amount of power as well. Thus, the system 200 can be applied to storage system memory power savings and processor power reductions. For example, voltage and frequency scaling can be applied on the processor 220 and where multiple cores are used, turning some cores off.

Unlike dynamic voltage and frequency scaling that was applied in client devices, neither client systems nor servers shut off memory banks. The primary reason is that the pages in use are spread throughout the memory space and thus full banks cannot be shut off. In addition, neither client nor server systems have per memory bank control of power. Thus, storage segments 240 cannot individually be turned off and on. On a storage sub-system, techniques are provided to control where the data is stored in memory and can compact fragmented pages onto fewer banks and thus shut off those that are not needed.

Other power savings aspects include SLA-based or QOS-based power management. The SLA is service level agreement and QOS is quality of service. Using these techniques, SLA or QOS goals can be set on a storage stream, storage object, or class (group) of objects, or a class (group) of storage streams. Using the latter technique, when a file is opened, components can associate accesses on the respective handle with a designated storage class. Each class would have different characteristics e.g., promised, very fast commit, optimized for sequential access, reserved N-megabytes of buffer space, queue lengths no longer than e.g., 2, and so forth. Consequently, enough memory can be allocated to achieve the required quality of service and shut off remaining resources.

In another aspect, a memory manager system 200 is provided. The system 200 includes means for operating program functionality (e.g., storage segments 240) as one or more functional program blocks and means for enabling or disabling (e.g., I/O component 250) the functional program blocks in a storage subsystem. The system 200 also includes means for managing power (e.g., power manager 210, main program, server, and so forth) in the storage subsystem by selectively enabling or disabling the functional program blocks.

FIGS. 3-6 illustrate various aspects of segmenting programs into functional storage blocks in order to allow one or more memory segments to be selectively enabled or disabled as previously described.

Figure 3:
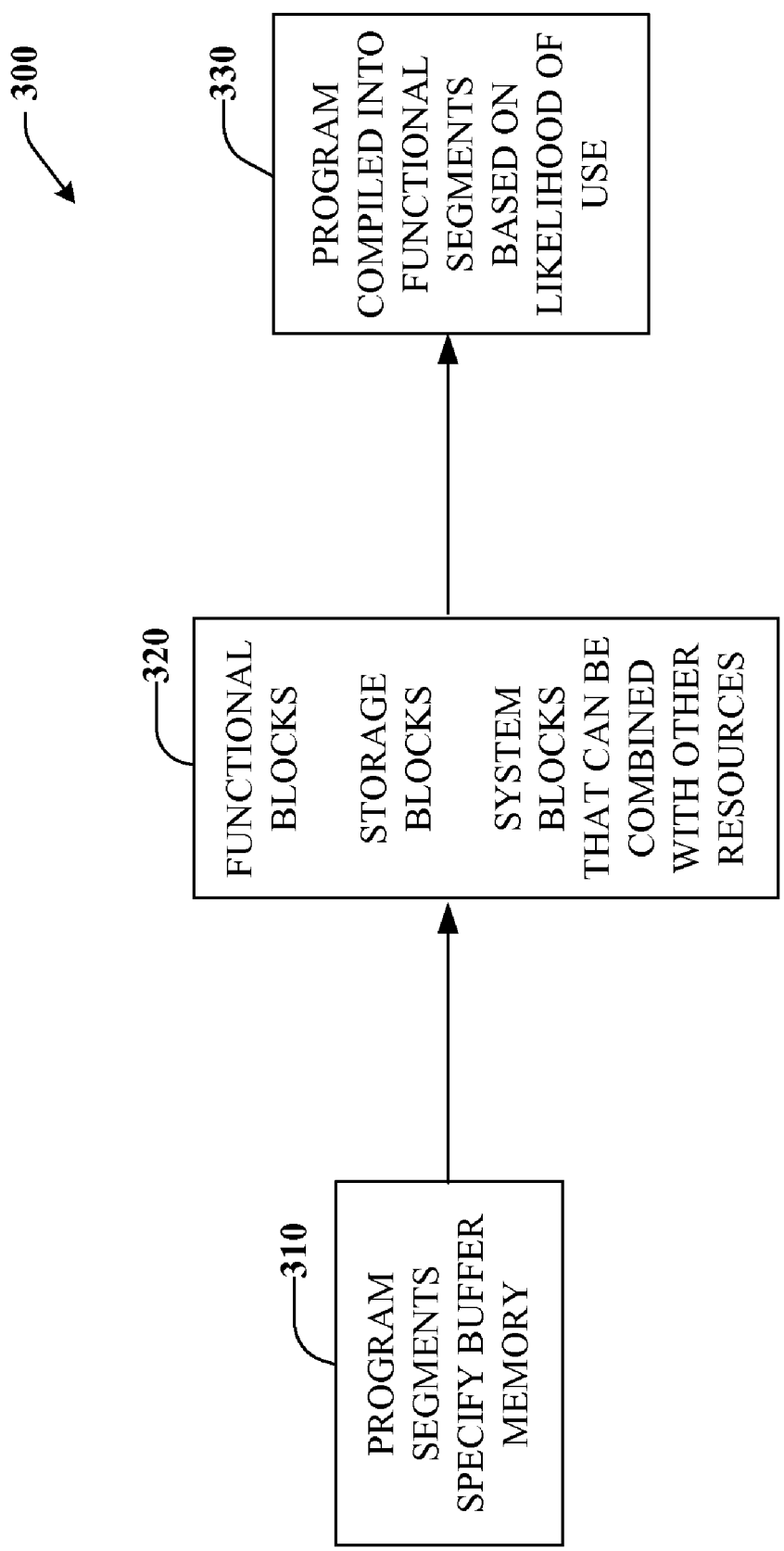
FIG. 3 is a high-level diagram that illustrates how program segments are managed into blocks that can be compiled into segments that are selectively enabled or disabled.

Turning to FIG. 3, a high-level system 300 illustrates how program segments are managed into blocks that can be compiled into segments that are selectively enabled or disabled. At 310, one or more program segments are created that can be ultimately executed within a physical storage segment described above. Such segmentation can be based on various criteria illustrated at 320 and includes functional program blocks, storage blocks, or system blocks that can be potentially combined with other resources. The blocks at 320 can define logical chunks that are known to execute within a range of addresses where non-executing chunks can reside in other segments that can be disabled to conserve power. Data blocks can be defined such that a functional program block that needs access to a particular type of data can access the data in an active memory segment that is enabled during program execution (versus a disabled segment turned off for power savings). Some system code such as power up/power down code, interrupt code, I/O code, or other code that is seldom accessed or utilized by the main program can be designated for storage in a deactivated memory segment. As shown at 330, programs or data elements can be compiled into functional segments based on likelihood of use or other power-saving criteria (e.g., policy, SLA, QOS, and so forth). Other compiler aspects will now be described with reference to FIGS. 4-6.

Figure 4:
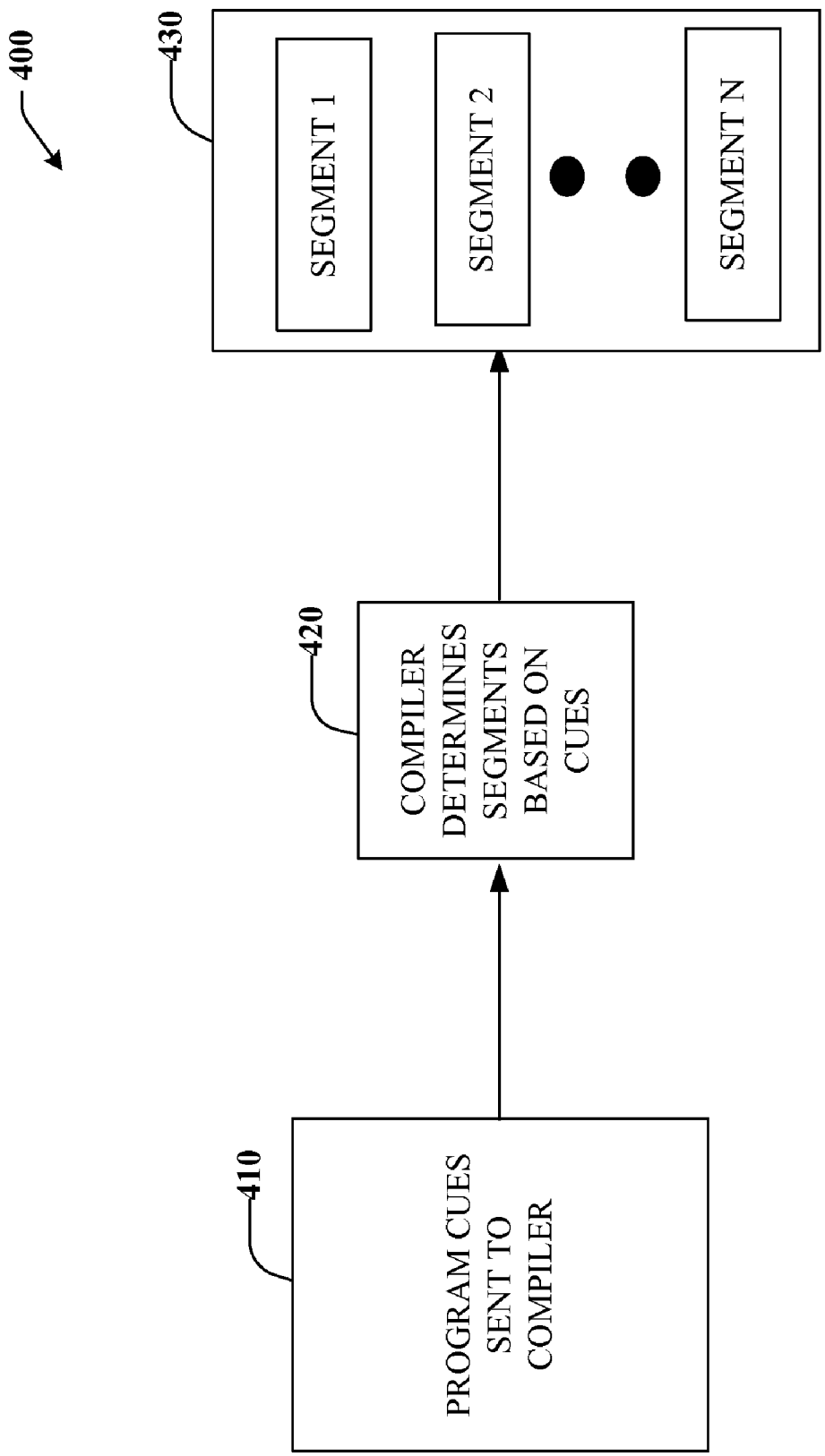
FIG. 4 illustrates a compiler system that analyzes program cues to determine functional memory blocks or segments.

Referring to FIG. 4, a compiler system 400 analyzes program cues to determine functional memory blocks or segments. In this aspect, one or more program cues are generated at and compiled at 420 to create one or more logical program or data segments at 430. Such segments 430 can then be selectively activated or deactivated within a memory cell such as a DIMM module or storage network described above. The cues at 410 can be manually generated by a programmer, where logical program or data segments are defined by programming structure. For instance, a range of execution addresses can be specified for program execution or data blocks can be defined to be stored within a given range. The cues can also define tags or metadata that specify the beginning and ending of a segment and under what execution or operating conditions such segments should be enabled or disabled. An execution processor can observe the metadata or tags, load a desired number of segments accordingly, execute the desired segments, and disable unused segments of code in order to conserve power.

Figure 5:
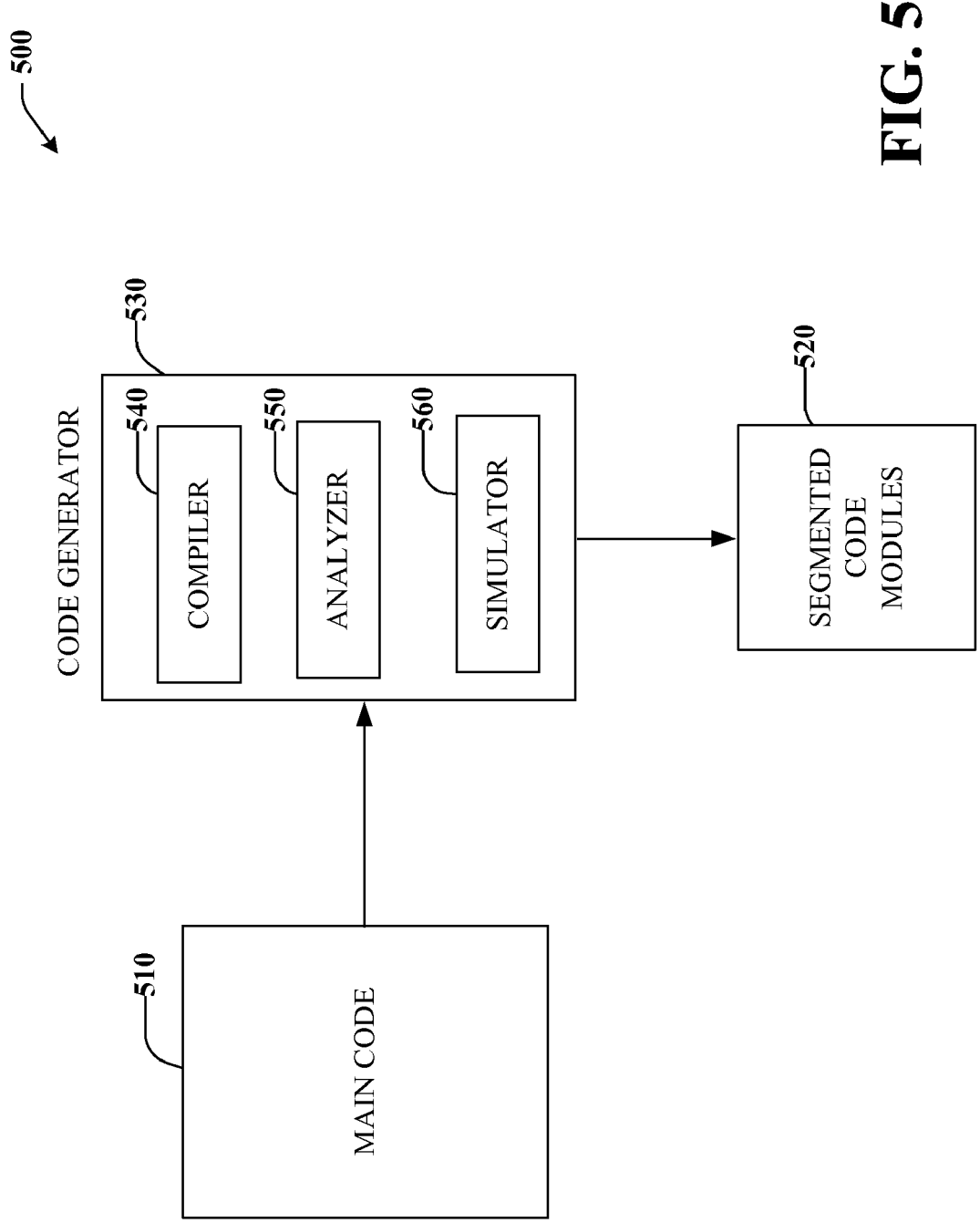
FIG. 5 illustrates a code generator system that analyzes system code and automatically generates segmented code modules.

Referring to FIG. 5, a code generator system 500 analyzes system code and automatically generates segmented code modules. In this aspect, automated components are provided that analyze a block of main code 510 and generates segmented code modules 520. A code generator 530 processes the main code 510 to determine the segmented code modules 520. The code generator can include a compiler 540 to generate the segments at 520 and an analyzer 550 that processes output from a simulator 560 to determine logical program functions or storage blocks for the respective segments at 520. The simulator 560 can include substantially any type of simulation package that can model execution of the main code 510. The analyzer 550 can include rules-based approaches to look for logical boundaries or ranges for data storage and code execution blocks. In one example, the analyzer 550 can include an artificial intelligence component (not shown) to make at least one inference or at least one determination that can be used to generate the segments 520.

The artificial intelligence component can employ one of numerous methodologies for learning from data and then drawing inferences and/or making determinations related to segmenting information across multiple storage units (e.g., Hidden Markov Models (HMMs) and related prototypical dependency models, more general probabilistic graphical models, such as Bayesian networks, e.g., created by structure search using a Bayesian model score or approximation, linear classifiers, such as support vector machines (SVMs), non-linear classifiers, such as methods referred to as "neural network" methodologies, fuzzy logic methodologies, and other approaches that perform data fusion, etc.) in accordance with implementing various automated aspects described herein. In addition, the artificial intelligence component can also include methods for capture of logical relationships such as theorem proofs or more heuristic rule-based expert systems. The artificial intelligence component can be represented as an externally pluggable component that in some cases can be designed by a disparate (third) party.

Figure 6:
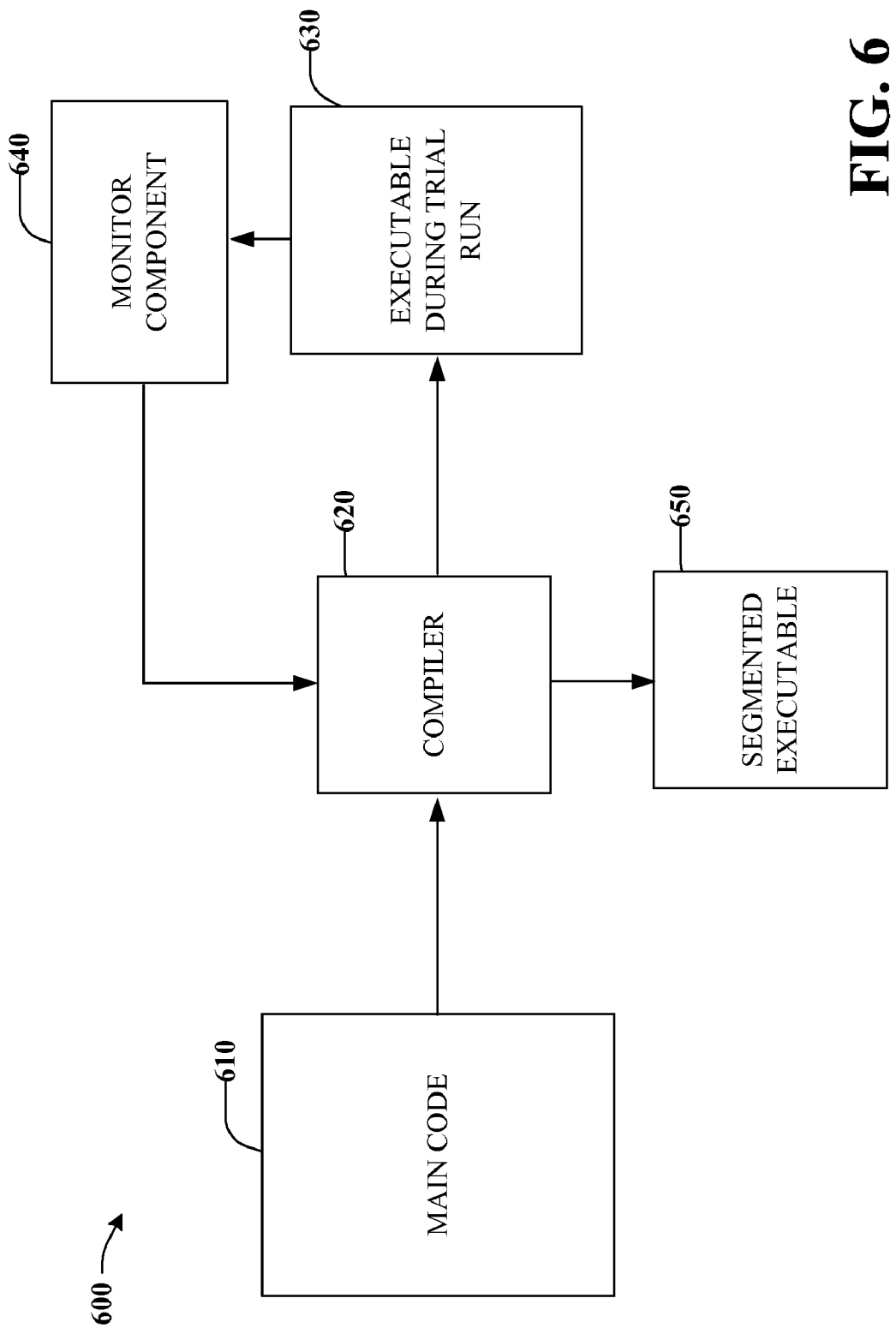
FIG. 6 illustrates a system that monitors code execution and automatically generates segmented executables.

Referring now to FIG. 6, a system 600 monitors code execution and automatically generates segmented executables. In this aspect, rather than simulate code execution as described above, main code 610 is compiled at 630 and executed as a running system in real time at 630. A monitor component 640 determines logical data storage blocks or code execution blocks of the executable 630 and feeds this information back to the compiler at 620. After a period of time and the initially compiled code has had a chance to execute at 630, the compiler 620 can recompile the main code 610 but this time use automated suggestions provided by the monitor component 640 regarding how to segment the main code and/or segment code storage blocks. After code has been segmented, another code trial run can occur at 630 with further monitoring at 640. Such process can be repeated as desired. After suitable performance is determined at 630, one or more code or data segments can be generated at 650 that can be conveniently stored according to the physical memory segments described above. Such memory segments can then be selectively and automatically enabled or disabled via a power manager to conserve power as program or storage needs dictate.

Figure 7:
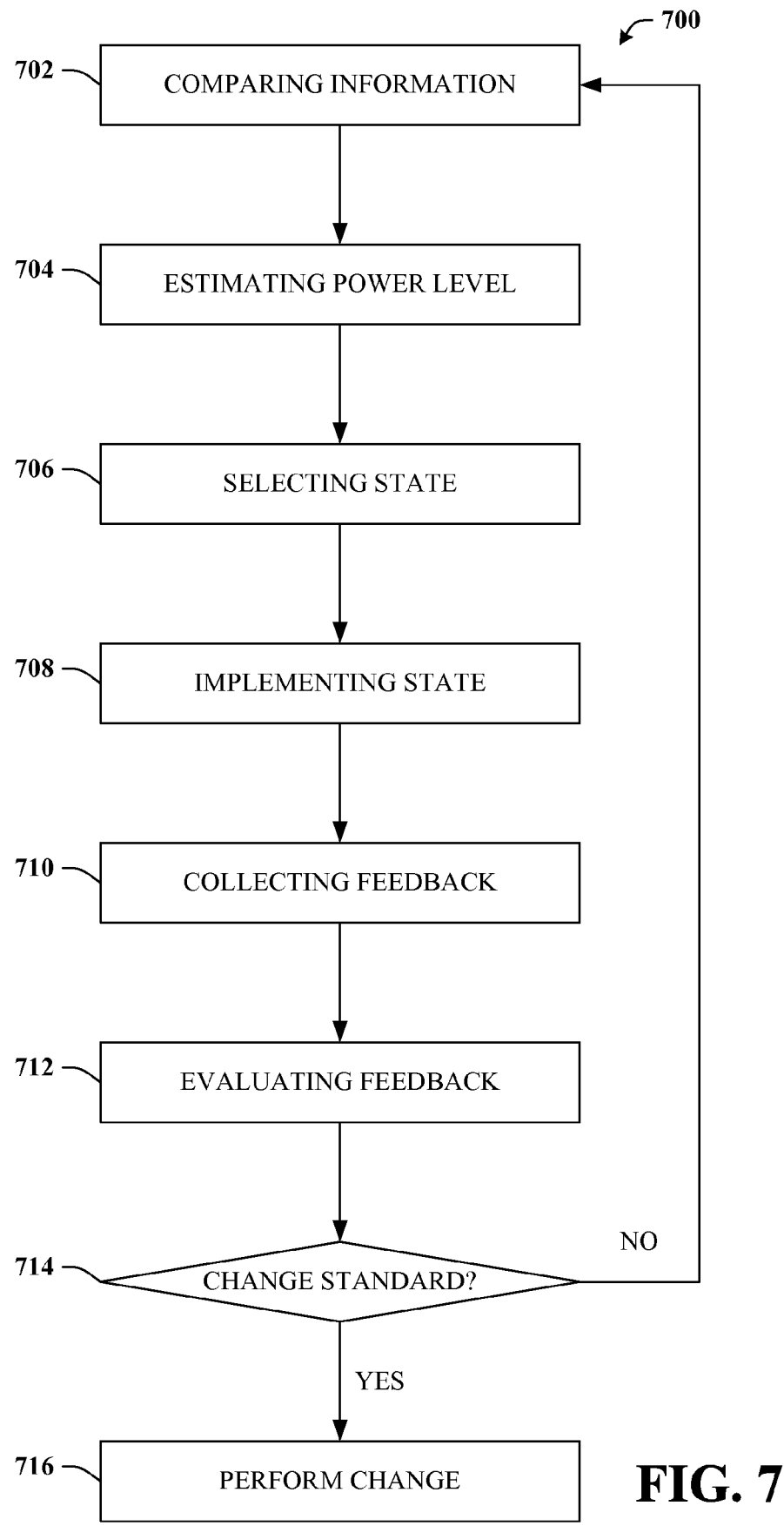
FIG. 7 illustrates a methodology for controlling a power state of a storage device.

Now referring to FIG. 7, an example methodology 700 is disclosed for using feedback to facilitate power state changes upon a component of a storage medium or configuration. Information that is retained in a buffer can be compared against information held in storage to determine if there is unused memory data or instructions at 702. If there is no unused data or instructions in the buffer or storage, then the methodology 700 can end to conserve resources.

An estimated power level to adequately retain information or instructions can be determined at 704. A state can then be selected at 706 as a function of the comparison as well as the estimated power level. In addition, a sliding scale can be selected, where more or less power is consumed as information is processed. A selected state change can be implemented at 708, which can include changing the power state as well as sending an instruction to change the state. Feedback can be collected that pertains to the storage configuration through act 710. For instance, if an instruction is transmitted to change the state, feedback can be gathered to ascertain if the instruction is ultimately followed, when execution of the instruction occurs, or what takes place when the instruction is executed, and the like. The feedback can be evaluated through 712 and a check 714 can occur to determine if the methodology 700 (as well as other aspects disclosed herein) should change operation. If the check 714 determines a power standard should change, then an appropriate change is selected and implemented at 716. If a change should not occur, then the methodology 700 can return to action 702 to compare information.

Figure 8:
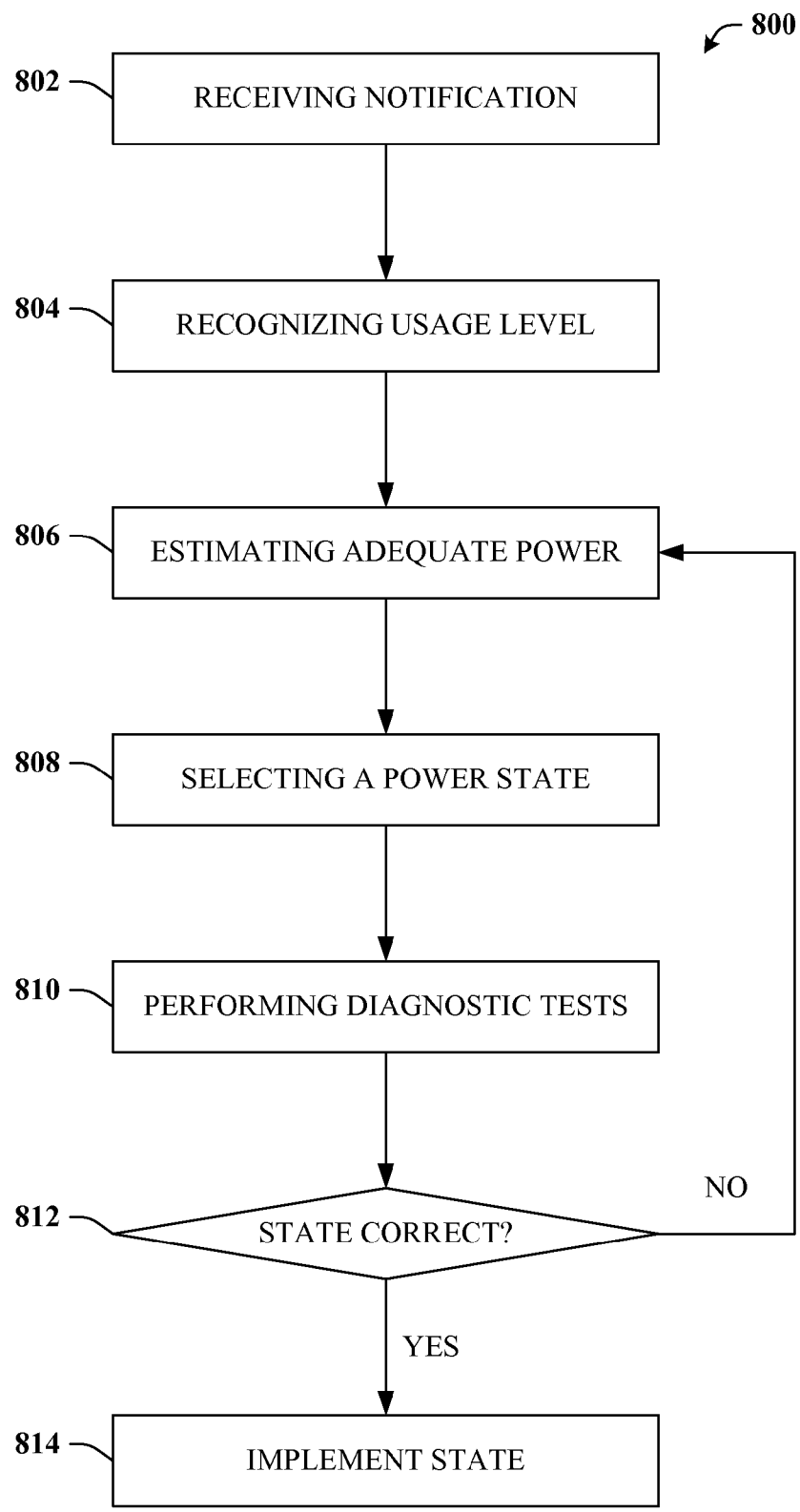
FIG. 8 illustrates a methodology for verifying a selected power state of a storage device.

Now referring to FIG. 8, an example methodology 800 is disclosed for managing power in relation to an enterprise device. A notice can be received that an operation is to take place at 802 (e.g., a read, a write, use as a staging area, and the like). Typically, the notice originates from a host device, user instruction, automatically, and the like.

The notification can include a suggested usage level for a component of the enterprise device and the notice level can be extracted at 804. A power estimation can be performed at 806 that relates to an amount of power that is used to perform an operation designated in the notification. A state for powering the device can be selected at 808, where the selected state can place the device in the condition to consume the estimated power.

Various diagnostic tests can be performed upon the device to determine a power state that is currently engaged at 810. A check can be performed to determine if a current state of the component is in line with the selected state. If the states are substantially similar (e.g., equal, close enough to not warrant a change, and so forth), then the methodology 800 can return to estimating power to perform the operation. If the state should change, then the selected state can be implemented at 814.

For purposes of simplicity of explanation, methodologies that can be implemented in accordance with the disclosed subject matter were shown and described as a series of blocks or acts. However, it is to be understood and appreciated that the claimed subject matter is not limited by the order of the blocks, as some blocks can occur in different orders and/or concurrently with other blocks from what is depicted and described herein. Moreover, not all illustrated blocks can be required to implement the methodologies described hereinafter. Additionally, it should be further appreciated that the methodologies disclosed throughout this specification are capable of being stored on an article of manufacture to facilitate transporting and transferring such methodologies to computers. The term article of manufacture, as used, is intended to encompass a computer program accessible from any computer-readable device, carrier, or media.

Figure 9:
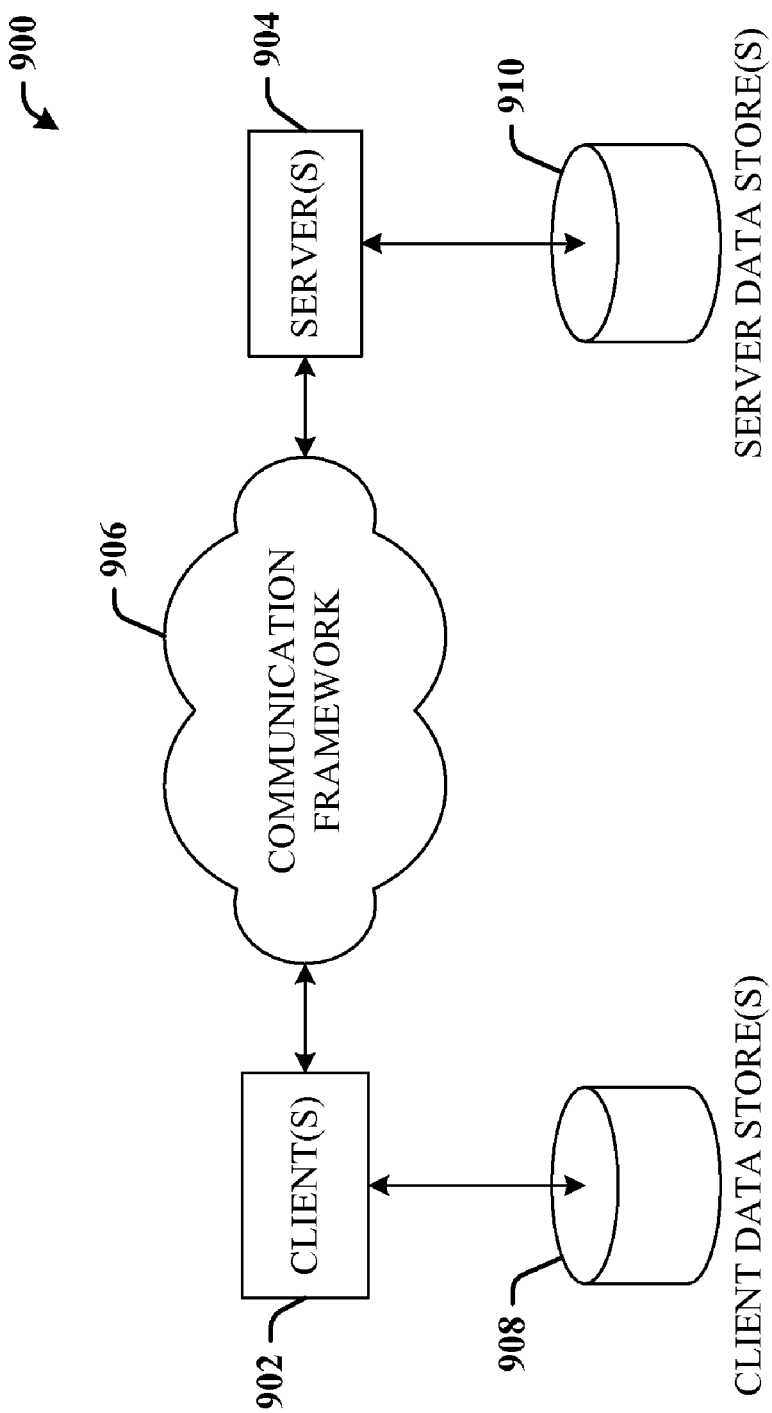
FIG. 9 is schematic block diagram of an example computing environment.
Figure 10:
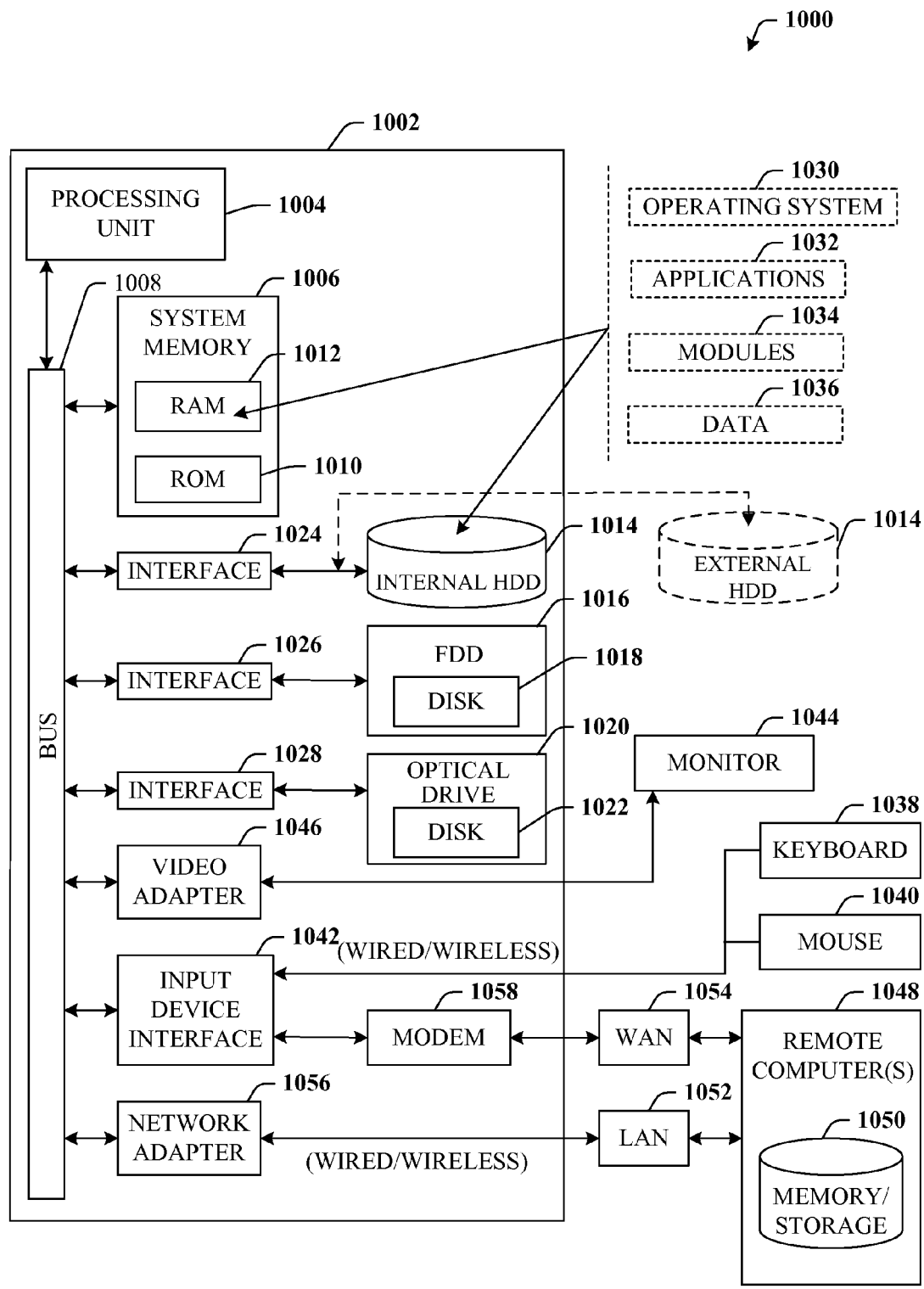
FIG. 10 is a schematic block diagram of a computer operable to execute a memory power manager.

In order to provide a context for the various aspects of the disclosed subject matter, FIGS. 9 and 10 as well as the following discussion are intended to provide a brief, general description of a suitable environment in which the various aspects of the disclosed subject matter can be implemented. While the subject matter has been described above in the general context of computer-executable instructions of a program that runs on one or more computers, those skilled in the art will recognize that the subject matter described herein also can be implemented in combination with other program modules. Generally, program modules include routines, programs, components, data structures, etc. that perform particular tasks and/or implement particular abstract data types. Moreover, those skilled in the art will appreciate that the inventive methods can be practiced with other computer system configurations, including single-processor, multiprocessor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects can also be practiced in distributed computing environments where tasks are performed by remote processing devices that are linked through a communications network. However, some, if not all aspects of the claimed subject matter can be practiced on stand-alone computers. In a distributed computing environment, program modules can be located in both local and remote memory storage devices.

Referring now to FIG. 9, there is illustrated a schematic block diagram of a computing environment 900 in accordance with the subject specification. The system 900 includes one or more client(s) 902. The client(s) 902 can be hardware and/or software (e.g., threads, processes, computing devices). The client(s) 902 can house cookie(s) and/or associated contextual information by employing the specification, for example.

The system 900 also includes one or more server(s) 904. The server(s) 904 can also be hardware and/or software (e.g., threads, processes, computing devices). The servers 904 can house threads to perform transformations by employing the specification, for example. One possible communication between a client 902 and a server 904 can be in the form of a data packet adapted to be transmitted between two or more computer processes. The data packet can include a cookie and/or associated contextual information, for example. The system 900 includes a communication framework 906 (e.g., a global communication network such as the Internet) that can be employed to facilitate communications between the client (s) 902 and the server(s) 904.

Communications can be facilitated via a wired (including optical fiber) and/or wireless technology. The client(s) 902 are operatively connected to one or more client data store(s) 908 that can be employed to store information local to the client(s) 902 (e.g., cookie(s) and/or associated contextual information). Similarly, the server(s) 904 are operatively connected to one or more server data store(s) 910 that can be employed to store information local to the servers 904.

Referring now to FIG. 10, there is illustrated a block diagram of a computer operable to execute the disclosed architecture. In order to provide additional context for various aspects of the subject specification, FIG. 10 and the following discussion are intended to provide a brief, general description of a suitable computing environment 1000 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embody computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared and other wireless media. Combinations of the any of the above should also be included within the scope of computer-readable media.

With reference again to FIG. 10, the example environment 1000 for implementing various aspects of the specification includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors or proprietary specific configured processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes read-only memory (ROM) 1010 and random access memory (RAM) 1012. A basic input/output system (BIOS) is stored in a non-volatile memory 1010 such as ROM, EPROM, EEPROM, which BIOS contains the basic routines that help to transfer information between elements within the computer 1002, such as during start-up. The RAM 1012 can also include a high-speed RAM such as static RAM for caching data.

The computer 1002 further includes an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject specification.

The drives and their associated computer-readable media provide nonvolatile storage of data, data structures, computer-executable instructions, and so forth. For the computer 1002, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, can also be used in the example operating environment, and further, that any such media can contain computer-executable instructions for performing the methods of the specification.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is appreciated that the specification can be implemented with various proprietary or commercially available operating systems or combinations of operating systems.

A user can enter commands and information into the computer 1002 through one or more wired/wireless input devices, e.g., a keyboard 1038 and a pointing device, such as a mouse 1040. Other input devices (not shown) can include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 via an interface, such as a video adapter 1046. In addition to the monitor 1044, a computer typically includes other peripheral output devices (not shown), such as speakers, printers, etc.

The computer 1002 can operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 is connected to the local network 1052 through a wired and/or wireless communication network interface or adapter 1056. The adapter 1056 can facilitate wired or wireless communication to the LAN 1052, which can also include a wireless access point disposed thereon for communicating with the wireless adapter 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 via the input device interface 1042. In a networked environment, program modules depicted relative to the computer 1002, or portions thereof, can be stored in the remote memory/storage device 1050. It will be appreciated that the network connections shown are example and other means of establishing a communications link between the computers can be used.

The computer 1002 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

The aforementioned systems have been described with respect to interaction among several components. It should be appreciated that such systems and components can include those components or sub-components specified therein, some of the specified components or sub-components, and/or additional components. Sub-components can also be implemented as components communicatively coupled to other components rather than included within parent components. Additionally, it should be noted that one or more components could be combined into a single component providing aggregate functionality. The components could also interact with one or more other components not specifically described herein but known by those of skill in the art.

What has been described above includes examples of the subject specification. It is, of course, not possible to describe every conceivable combination of components or methodologies for purposes of describing the subject specification, but one of ordinary skill in the art can recognize that many further combinations and permutations of the subject specification are possible. Accordingly, the subject specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A power management system, comprising:
   a permanent storage medium that comprises a plurality of storage segments that are individually controllable;
   a compiler to compile and create code, including creating redundant code, the redundant code preventing executing code from having to access a different segment; and
   a power manager that analyzes requirements of programs that access the permanent storage medium and selectively enables or disables a subset of the storage segments in order to mitigate power consumption of the permanent storage medium, the mitigation including;
   providing power to a first storage segment containing a first segment of the redundant code; and
   providing no power to a second storage segment containing a second segment of the redundant code.

2. The system of claim 1, the power manager is provided as a separate component or as part of a main computer or server program.

3. The system of claim 1, the plurality of storage segments are provided as part of dual inline memory module (DIMM), a solid state disk drive (SSD), a Storage Area Network (SAN), a Network Attached Storage (NAS) device, and a Direct Attached Storage (DAS) device.

4. The system of claim 1, the power manager enables or disables the storage segments based on functional program blocks or static data requirements that include help or power down functionality.

5. The system of claim 4, further comprising instructions received by the compiler indicating how to segment programs into the functional program blocks.

6. The system of claim 5, the compiler analyzes and simulates code execution to determine the functional program blocks.

7. The system of claim 6, the compiler receives automated feedback during code execution to determine the functional program blocks.

8. The system of claim 5, further comprising a metadata component that identifies a power state for the functional program blocks.

9. The system of claim 5, further comprising power components to enable or disable one or more processors in order to mitigate system power consumption, the power components employ voltage or frequency scaling to control power consumption.

10. The system of claim 1, further comprising a component to control power consumption based at least in part on a service level agreement (SLA).

11. The system of claim 10, further comprising a component to control power consumption based at least in part on a quality of service (QOS) parameter.

12. The system of claim 11, the SLA or the QOS parameter is based at least in part on a storage stream, a storage object, a class of storage objects, or a class of storage streams.

13. The system of claim 12, further comprising a component that associates memory access with a handle to a designated class.

14. The system of claim 12, further comprising a class component that provides one or more characteristics including promised, very fast commit, optimized for sequential access, reserved N-megabytes of buffer space, or queue lengths of a designated specification.

15. A method to conserve power in a storage subsystem, comprising:
   segmenting storage blocks into power-controllable segments;
   generating segmented program or data elements into functional program blocks, at least two of the functional program blocks including a redundant code segment;
   executing the functional program blocks within one or more of the power-controllable segments; and
   enabling or disabling unused portions of the power-controllable segments to mitigate power consumption in a storage subsystem, the mitigation including;
   turning power on to a first power-controllable segment containing the redundant code segment; and
   turning power off to a second power-controllable segment containing of the redundant code segment.

16. The method of claim 15, further comprising enabling or disabling one or more processors to mitigate power consumption.

17. The method of claim 15, further comprising employing a service level agreement or a quality of service parameter to mitigate power consumption.

18. The method of claim 15, further comprising designating members of the functional program blocks as members of a class.

19. The method of claim 18, further comprising monitoring output from a compiler to determine the functional program blocks.

20. A method to manage power in a memory system, comprising:
- segmenting storage blocks into segments over which power is individually controllable;
- compiling code into functional program blocks;
- including redundant code in at least first and second functional program blocks;
- locating each functional program block in a segment over which power is controllable;
- turning power on to a first segment including the first functional program block;
- turning power off to a second segment including the second functional program block; and
- executing code with a processor, the executed code including redundant code in the first functional program block and not including redundant code in the second functional program block.

* * * * *